United States Patent
Yang et al.

(10) Patent No.: US 10,938,544 B2
(45) Date of Patent: Mar. 2, 2021

(54) METHOD AND DEVICE OF DATA SYNCHRONIZATION AND DATA COLLECTION FOR AERIAL VEHICLE AND AERIAL VEHICLE

(71) Applicant: SZ DJI TECHNOLOGY CO., LTD., Shenzhen (CN)

(72) Inventors: Shuo Yang, Shenzhen (CN); Jiahang Ying, Shenzhen (CN); Zhaoliang Peng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 353 days.

(21) Appl. No.: 15/985,384

(22) Filed: May 21, 2018

(65) Prior Publication Data

US 2018/0270042 A1  Sep. 20, 2018

Related U.S. Application Data

(63) Continuation of application No. PCT/CN2015/095291, filed on Nov. 23, 2015.

(51) Int. Cl.
*H04L 7/00* (2006.01)
*H04J 3/06* (2006.01)
(Continued)

(52) U.S. Cl.
CPC .......... *H04L 7/0091* (2013.01); *B60R 16/023* (2013.01); *G01D 21/00* (2013.01); *G08G 5/0013* (2013.01); *G08G 5/0069* (2013.01); *H04J 3/0638* (2013.01); *H04L 12/40032* (2013.01); *H04L 67/12* (2013.01); *H04L 67/125* (2013.01);
(Continued)

(58) Field of Classification Search
USPC .......................................................... 702/89
See application file for complete search history.

(56) References Cited

U.S. PATENT DOCUMENTS 9,555,883 B1 *  1/2017  Navot .................... B64C 39/02
10,285,141 B1 *  5/2019  Carver ................. A61B 5/0015
(Continued)

FOREIGN PATENT DOCUMENTS

CN  101949715 A  1/2011
CN  203218790 U  9/2013
(Continued)

OTHER PUBLICATIONS

The World Intellectual Property Organization (WIPO) International Search Report for PCT/CN2015/095291 dated Aug. 15, 2016 5 pages (including translation).

*Primary Examiner* — Paul D Lee
(74) *Attorney, Agent, or Firm* — Anova Law Group, PLLC (57) ABSTRACT

A method of data synchronization for an aerial vehicle includes a controller of the aerial vehicle generating one or more time stamps each representing a clock time of the controller, sending instruction information to one or more sensors of the aerial vehicle, the instruction information carrying the one or more time stamps and directing the one or more sensors to perform data collection, and receiving one or more data packets returned from the one or more sensors. Each of the one or more data packets carries one of the one or more time stamps and includes data collected by one of the one or more sensors in response to the instruction information.

15 Claims, 4 Drawing Sheets

(51) Int. Cl.
*G08G 5/00* (2006.01)
*H04L 12/40* (2006.01)
*H04L 29/08* (2006.01)
*G01D 21/00* (2006.01)
*H04W 4/38* (2018.01)
*H04W 4/40* (2018.01)
*H04L 29/06* (2006.01)
*B60R 16/023* (2006.01)

(52) U.S. Cl.
CPC .............. *H04L 69/22* (2013.01); *H04W 4/38* (2018.02); *H04W 4/40* (2018.02); *H04L 29/08* (2013.01); *H04L 2012/4028* (2013.01)

(56) References Cited

U.S. PATENT DOCUMENTS

| | | | | |
|---|---|---|---|---|
| 2007/0116118 | A1* | 5/2007 | Kostrzewski | H04L 1/0014 375/240.12 |
| 2011/0019558 | A1* | 1/2011 | Rowe | H04L 67/12 370/252 |
| 2012/0265483 | A1 | 10/2012 | Pelant et al. | |
| 2014/0172357 | A1* | 6/2014 | Heinonen | G01C 21/005 702/150 |
| 2015/0268154 | A1* | 9/2015 | Strahan | G01N 25/56 702/104 |

FOREIGN PATENT DOCUMENTS

| | | |
|---|---|---|
| CN | 103413444 A | 11/2013 |
| CN | 104270567 A | 1/2015 |
| EP | 2378822 A2 | 10/2011 |

* cited by examiner

METHOD AND DEVICE OF DATA SYNCHRONIZATION AND DATA COLLECTION FOR AERIAL VEHICLE AND AERIAL VEHICLE

CROSS-REFERENCE TO RELATED APPLICATION

This application is a continuation of International Application No. PCT/CN2015/095291, filed on Nov. 23, 2015, the entire contents of which are incorporated herein by reference.

TECHNICAL FIELD

The present disclosure relates to a flight technology, and more particularly to a method and a device of data synchronization and data collection for an aerial vehicle, and the aerial vehicle.

BACKGROUND OF THE DISCLOSURE

Unmanned aerial vehicles (UAVs), also known as drones, have been widely used in various fields including military and agriculture applications. For instance, UAVs can be used to perform various tasks including aerial photography, highway survey, border patrol, forest fire protection and disaster assessment.

UAVs can be provided with various sensors to collect various types of data. All or a part of data collected from the various sensors can be selected for data analysis in view of different requirements of different applications. However, a clock asynchronization may occur among various sensors of UAVs. A deviation may occur in data analysis if the sensor data analyzed by a controller of the UAV is not collected by the sensors at a same timing, leading to an error in the task performed by the UAV.

SUMMARY OF THE DISCLOSURE

The disclosure provides a method and a device of data synchronization and data collection for an aerial vehicle, and the aerial vehicle. A synchronization in data collection can be effected, thereby reducing errors in data analysis.

One aspect of the disclosure provides a method of data synchronization of an aerial vehicle. The method can comprise generating, by a controller of the aerial vehicle, a time stamp representing a current clock time of the controller; sending instruction information to a sensor of the aerial vehicle, the instruction information directing the sensor to collect data, the instruction information carrying the time stamp; and receiving a data packet returned from the sensor. The data packet can include data collected by the sensor in response to the instruction information. The data packet can carry the time stamp.

In some embodiments, generating a time stamp representing a current clock time of the controller can comprise generating a time stamp representing a current time if a condition of synchronization is satisfied.

In some embodiments, generating a time stamp representing a current time if a condition of synchronization is satisfied can comprise generating the time stamp representing a current time upon detecting an instruction of synchronization.

In some embodiments, generating the time stamp representing a current time upon detecting an instruction of synchronization can comprise generating the time stamp representing a current time if a synchronization request initiated by a sensor external to the aerial vehicle is detected. A clock of the sensor external to the aerial vehicle can be not synchronized with a clock of the controller.

In some embodiments, generating a time stamp representing a current time if a condition of synchronization is satisfied can comprise detecting whether a current time is a data synchronization time which is calculated from a preset data synchronization cycle, and generating the time stamp representing a current time if the current time is the data synchronization time.

In some embodiments, generating a time stamp representing a current time if a condition of synchronization is satisfied can comprise generating the time stamp representing a current time if an instruction of synchronization is generated by the controller.

In some embodiments, sending instruction information to a sensor of the aerial vehicle can comprise sending the instruction information to a sensor external to the aerial vehicle. A clock of the sensor external to the aerial vehicle can be not synchronized with a clock of the controller.

In some embodiments, sending instruction information to a sensor of the aerial vehicle can comprise sending a pulse signal to the sensor of the aerial vehicle. The pulse signal can carry the time stamp and directs the sensor to collect data.

In some embodiments, the sensor can be a sensor external to the aerial vehicle. In some instances, sending instruction information to a sensor of the aerial vehicle can comprise controlling an input and output device of the aerial vehicle to output the pulse signal to the sensor external to the aerial vehicle.

In some embodiments, the data packet can comprise a synchronization indication, which synchronization indication indicating that the data packet carries the time stamp.

In some embodiments, the synchronization indication can be a synchronization bit in the data packet, the synchronization bit being set to 1.

In some embodiments, before sending instruction information to a sensor of the aerial vehicle, the method can further comprise determining at least one target sensor for clock synchronization from among sensors of the aerial vehicle. In some instances, sending instruction information to a sensor of the aerial vehicle can comprise sending the instruction information to the at least one target sensor of the aerial vehicle.

In some embodiments, after receiving a data packet returned from the sensor, the method can further comprise determining a clock time represented by the time stamp carried in the data packet, and analyzing data packets corresponding to the same clock time based upon the clock time represented by the time stamp carried in the data packet.

In some embodiments, sending instruction information to a sensor of the aerial vehicle can comprise sending the instruction information to an image sensor external to the aerial vehicle, a clock of the image sensor being not synchronized with a clock of the controller. In some instances, before determining a clock time represented by the time stamp carried in the data packet, the method can further comprise obtaining attitude data collected by an attitude sensor built in the aerial vehicle. In some instances, determining a clock time represented by the time stamp carried in the data packet can comprise determining a clock time represented by the time stamp carried in the data packet returned from the image sensor. In some instances, analyzing data packets corresponding to the same clock time based upon the clock time represented by the time stamp carried in the data packet can comprise determining attitude data collected by the attitude sensor at the same clock time the image sensor collecting data based upon the determined clock time represented by the time stamp carried in the data packet returned from the image sensor, and analyzing a flight state of the aerial vehicle based upon the determined attitude data collected by the attitude sensor and the data packet collected by the image sensor.

Another aspect of the disclosure provides method of data collection for an aerial vehicle. The method can comprise receiving, by a sensor of the aerial vehicle, instruction information from a controller of the aerial vehicle, the instruction information carrying a time stamp, which time stamp being generated by the controller and indicating a clock time of the controller; collecting data in response to the instruction information; generating a data packet comprising data collected by the sensor and the time stamp; and sending the data packet to the controller.

In some embodiments, the sensor of the aerial vehicle can be a sensor external to the aerial vehicle. A clock of the sensor external to the aerial vehicle can be not synchronized with a clock of the controller.

In some embodiments, receiving instruction information from a controller of the aerial vehicle can comprise receiving a pulse signal from the controller, which pulse signal carrying the time stamp.

In some embodiments, the sensor of the aerial vehicle can be a sensor external to the aerial vehicle. In some instances, receiving a pulse signal from the controller can comprise receiving the pulse signal from the controller via an input and output device. A clock of the sensor external to the aerial vehicle can be not synchronized with a clock of the controller.

In some embodiments, generating a data packet comprising data collected by the sensor and the time stamp can comprise generating a data packet comprising data collected by the sensor, the time stamp and a synchronization indication, which synchronization indication indicating that the data packet carries the time stamp.

In some embodiments, the synchronization indication can be a synchronization bit, the synchronization bit being set to 1.

Another aspect of the disclosure provides device of data synchronization for an aerial vehicle. The device can comprise a time stamp generation unit configured to generate a time stamp representing a current clock time of a controller; an instruction sending unit, configured to send instruction information to a sensor of the aerial vehicle to direct the sensor to collect data, the instruction information carrying the time stamp; and a data receiving unit configured to receive a data packet returned from the sensor. The data packet can include data collected by the sensor in response to the instruction information. The data packet can carry the time stamp.

In some embodiments, the time stamp generation unit can comprise a time stamp generation subunit configured to generate a time stamp representing a current time if a condition of synchronization is satisfied.

In some embodiments, the time stamp generation subunit can comprise a first generation subunit configured to generate the time stamp representing a current time upon detecting an instruction of synchronization.

In some embodiments, the first generation subunit can comprise a request trigger subunit configured to generate the time stamp representing a current time if a synchronization request initiated by a sensor external to the aerial vehicle is detected. A clock of the sensor external to the aerial vehicle can be not synchronized with a clock of the controller.

In some embodiments, the time stamp generation subunit can comprise a cycle detection subunit configured to detect whether a current time is a data synchronization time which is calculated from a preset data synchronization cycle, and a cycle generation subunit configured to generate the time stamp representing a current time if the current time is the data synchronization time.

In some embodiments, the time stamp generation subunit can comprise an initiation subunit configured to generate the time stamp representing a current time if an instruction of synchronization is generated by the controller.

In some embodiments, the instruction sending unit can comprise an instruction sending subunit configured to send the instruction information to a sensor external to the aerial vehicle. A clock of the sensor external to the aerial vehicle can be not synchronized with a clock of the controller.

In some embodiments, the instruction information sent by the instruction sending unit to the sensor of the aerial vehicle can be a pulse signal. The pulse signal can carry the time stamp and directs the sensor to collect data.

In some embodiments, the sensor can be a sensor external to the aerial vehicle. The instruction sending unit can comprise a pulse sending subunit configured to control an input and output device of the aerial vehicle to output the pulse signal to the sensor external to the aerial vehicle In some embodiments, the data packet received by the data receiving unit can comprise a synchronization indication, which synchronization indication indicating that the data packet carries the time stamp.

In some embodiments, the synchronization indication can be a synchronization bit in the data packet, the synchronization bit being set to 1.

In some embodiments, the device can further comprise a target determination unit configured to determine at least one target sensor for clock synchronization from among sensors of the aerial vehicle before the instruction information is sent by the instruction sending unit. The instruction sending unit can comprise a target instructing subunit configured to send the instruction information to the at least one target sensor of the aerial vehicle.

In some embodiments, the device can further comprise a time determination unit configured to determine a clock time represented by the time stamp carried in the data packet, and a data analysis unit configured to analyze data packets corresponding to the same clock time based upon the clock time represented by the time stamp carried in the data packet.

Another aspect of the disclosure provides a device of data collection for an aerial vehicle. The device can comprise an instruction receiving unit configured to receive instruction information from a controller of the aerial vehicle, the instruction information carrying an time stamp, the time stamp being generated by the controller to indicate a clock time of the controller; a data collection unit configured to collect data in response to the instruction information; a data generation unit configured to generate a data packet, the data packet including data collected and the time stamp; and a data sending unit configured to send the data packet to the controller.

In some embodiments, the instruction receiving unit can comprise a pulse receiving unit configured to receive a pulse signal sent by the controller, the pulse signal carrying the time stamp.

In some embodiments, the pulse receiving unit can be configured to receive the pulse signal from the controller via an input and output device.

In some embodiments, the data generation unit can comprise a data generation subunit configured to generate a data packet comprising data collected by the sensor, the time stamp and a synchronization indication. The synchronization indication can indicate that the data packet carries the time stamp.

In some embodiments, the synchronization indication can be a synchronization bit, the synchronization bit being set to 1.

Another aspect of the disclosure provides an aerial vehicle. The aerial vehicle can comprise a storing medium, a controller, and at least one sensor. The controller can be configured to generate a time stamp representing a current clock time of the controller, send instruction information to the sensor, and receive a data package returned from the sensor. The instruction information can direct the sensor to collect data. The instruction information can carry the time stamp. The at least one sensor can be configured to collect data in response to the instruction information, generate a data packet including data collected by the sensor and the time stamp, and send the data packet to the controller. The storing medium can be configured to store a program data of the controller and the sensor.

In the technical solutions described hereinabove, a time stamp can be carried in the instruction information sent from the controller to the sensor, the time stamp representing a current clock time of the controller. The time stamp carried in the instruction information can indicate the clock time at which the controller instructs the sensor to collect data. The same time stamp can be carried in the data packet returned from the sensor. Therefore, the controller can determine the clock time at which the sensor collects the data based upon the time stamp carried in the data packet. As the clock time of the time stamp is based upon the clock of the controller, a data synchronization can be effected by determining data collected by various sensors at the same time based upon the time stamps carried in the data packets. Errors in data analysis due to data collected at different times can be avoided.

BRIEF DESCRIPTION OF THE DRAWINGS

Drawings will be descried for a better understanding of technical solutions provided in embodiments of the disclosure. It will be appreciated that, the embodiments described with reference to the drawings are merely provided by way of example only. Those skilled in the art can conceive other drawings in light of those drawings disclosed herein without inventive efforts.

DETAILED DESCRIPTION OF THE DISCLOSURE

A method and a device of data synchronization and data collection for an aerial vehicle, and the aerial vehicle, are provided in embodiments of the disclosure. A synchronization in data collection can be achieved, thereby reducing errors in data analysis.

A better understanding of the disclosure will be obtained by reference to the following detailed description that sets forth illustrative embodiments with reference to the drawings. It will be apparent that, the embodiments described herein are merely provided by way of example only. Those skilled in the art can conceive other embodiments in light of those embodiments disclosed herein without inventive efforts, and all these embodiments can be within the scope of the disclosure.

In one aspect, a method of data synchronization for an aerial vehicle of the disclosure is provided.

Figure 1:
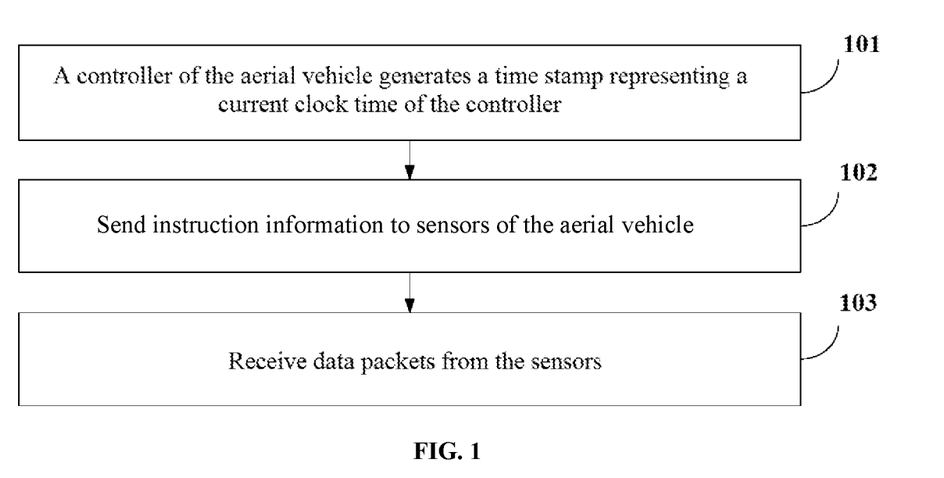
FIG. 1 shows a flow chart of a method of data synchronization for an aerial vehicle in accordance with an embodiment of the disclosure.

FIG. 1 shows a flow chart of a method of data synchronization for an aerial vehicle in accordance with an embodiment of the disclosure. In some embodiments, the method of data synchronization for an aerial vehicle can comprise steps 101 to 103.

In step 101, a time stamp representing a current clock time of a controller of the aerial vehicle can be generated by the controller.

In some instances, the time stamp can represent a time determined based upon a clock in the controller.

In step 102, instruction information can be sent to sensors of the aerial vehicle.

In some instances, the instruction information can be used to direct the sensors of the aerial vehicle to collect data.

In some embodiments, the time stamp generated in step 101 can be carried in the instruction information. The time stamp carried in the instruction information can be used to indicate the time at which the controller directs the sensors to collect data. The instruction information carrying the time stamp can be sent to the sensors, such that the sensors can collect data at the same clock time. A synchronization in data collection can be ensured, therefore various state data of the aerial vehicle at the same time can be obtained.

In step 103, data packets can be received from the sensors.

In some instances, the data packet can be a data packet provided by the sensor in response to the instruction information. The data packet can comprise data collected by the sensor in response to the instruction information and can carry the time stamp.

It will be appreciated that, as the time stamp carried in the instruction information represents a time at which the controller instructs the sensor to collect data, once the time stamp being provided together with the collected data by the sensor to the controller, the controller can determine the time at which the data is collected by the sensor based upon the time stamp carried in the data.

In embodiments of the disclosure, a time stamp can be carried in the instruction information sent from the controller to the sensor, the time stamp representing a current clock time of the controller. The time stamp carried in the instruction information can indicate the clock time at which the controller instructs the sensor to collect data. The same time stamp can be carried in the data packet returned from the sensor. Therefore, the controller can determine the clock time at which the sensor collects the data based upon the time stamp carried in the data packet. As the clock time of the time stamp is based upon the clock of the controller, a data synchronization can be effected by determining data collected by various sensors at the same time based upon the time stamps carried in the data packets. Errors in data analysis due to data collected at different times can be avoided.

It will be appreciated that, sensors onboard the aerial vehicle can comprise a built-in sensor of the aerial vehicle and a sensor external to the aerial vehicle.

The built-in sensor of the aerial vehicle can include, For instance, an inertial measurement unit (IMU) which comprises a three-axis acceleration sensor and a gyroscope. It will be appreciated that, a clock of the built-in sensor of the aerial vehicle can be based on a clock of the controller of the aerial vehicle. In other words, a clock time in the built-in sensor of the aerial vehicle can be identical to a clock time of the controller. No clock synchronization issue may occur to the built-in sensor of the aerial vehicle; therefore, the controller can determine sensor data collected at the same time without performing a synchronization on data collected by the built-in sensor of the aerial vehicle using the method of data synchronization of the disclosure.

The sensor external to the aerial vehicle can be connected to the aerial vehicle via an universal interface of the aerial vehicle. A clock of sensor external to the aerial vehicle can be asynchronous with the clock of the controller of the aerial vehicle. A corresponding clock time of the controller at which data is collected by the sensor external to the aerial vehicle can be determined to avoid an error in data analysis due to the clock asynchronization.

In some embodiments, the step in which instruction information is sent to sensors of the aerial vehicle can include sending instruction information to the sensor external to the aerial vehicle. For instance, the instruction information can be sent to the external sensor by the controller of the aerial vehicle via an input and output device.

It will be appreciated that, in some embodiments, the time stamp generated by the controller can be carried in the instruction information each time the controller instructs the sensor to collect data, such that the controller can determine the clock time corresponding to the data received from various sensors in real time to effect a data synchronization. Alternatively, the time stamp can be generated by the controller and instruction information carrying the time stamp can be sent to the sensor only if a high accuracy in data analysis is required.

In some instances, a condition of synchronization can be set. The controller can generate the time stamp representing the current clock time if the condition of synchronization is met, such that the instruction information sent by the controller can carry the time stamp.

The condition of synchronization can be effected in various ways. In some instances, the controller can actively initiate a clock synchronization on the data collected by the sensor. The time stamp representing the current clock time can be generated if an instruction of synchronization is generated by the controller.

Optionally, the controller can generate the time stamp representing the current time when detecting an instruction of synchronization, and send the instruction information carrying the time stamp to the sensor. In some instances, the data synchronization can be initiated by the sensors of the aerial vehicle. For instance, the data synchronization can be initiated by the sensor external to the aerial vehicle, and the instruction of synchronization can be a synchronization request from the sensor external to the aerial vehicle. Once receiving the synchronization request, the controller can generate the time stamp representing the current time, and send the instruction information carrying the time stamp to the sensor of the aerial vehicle.

Optionally, an operator of the aerial vehicle can direct the aerial vehicle to perform a data synchronization. For instance, an instruction of synchronization can be provided to the controller by the operator of the aerial vehicle via a control device (e.g., a remote controller). Once receiving the instruction of synchronization from the remote controller, the controller can generate the time stamp representing the current time.

Optionally, the controller can perform a data synchronization periodically. For instance, the controller can determine whether or not the current time is a time for data synchronization (e.g., calculating from a preset data synchronization cycle). The time stamp representing the current time can be generated if the current time is a time for data synchronization. The data synchronization cycle can be preset in the controller. For instance, the data synchronization cycle can be 1 hour. A time for next data synchronization can be calculated from the data synchronization cycle counting from a time of last generating the time stamp. The time stamp representing the current time can be generated if it is the calculated next data synchronization time.

It will be appreciated that, in some instances, the preset data synchronization cycle can be preset in the controller. Optionally, the preset data synchronization cycle can be provided to the controller by the control device (e.g., the remote controller of the aerial vehicle) or the sensor external to the aerial vehicle when initiating the data synchronization. The controller can generate the time stamp periodically based upon the preset data synchronization cycle to perform the data synchronization.

It will be appreciated that, the controller can send the instruction information to the sensor of the aerial vehicle in various forms. In some instances, an instruction message in a specified protocol format can be sent from the controller to the sensor of the aerial vehicle, the instruction message carrying the time stamp representing the current clock time of the controller.

Optionally, the controller can send a pulse signal to the sensor of the aerial vehicle. The pulse signal can be used to instruct the sensor to collect data, the time stamp being carried in the pulse signal. Once detecting the pulse signal, the sensor of the aerial vehicle can perform a data collection to ensure a data collection at various sensors being performed at the same time. In this way, a data synchronization can be effected.

In some instances, the pulse signal can be sent to the sensor external to the aerial vehicle. As the controller is not capable of sending the pulse signal to the external sensor directly, the controller can control the input and output device of the aerial vehicle to send the pulse signal to the sensor external to the aerial vehicle.

It will be appreciated that, the control can send the instruction information to each one of the sensors of the aerial vehicle to perform a data synchronization for all sensors. Alternatively, the instruction information can be sent to some sensors having a data asynchronization issue. For instance, the instruction information can be sent to the external sensors of the aerial vehicle.

In order to improve an efficiency in data synchronization, prior to sending the instruction information, the controller can select at least one target sensor from among sensors of the aerial vehicle, a clock synchronization being performed to the target sensor. The instruction information can be sent to the at least one target sensor only. For instance, one or more sensors can be selected from the external sensors of the aerial vehicle as the target sensors. In some instances, attitude data of the aerial vehicle in capturing an image can be required. As the sensor for collection an attitude of the aerial vehicle is a built-in sensor of the aerial vehicle and a clock of the built-in sensor is synchronized with the clock of the controller, only the external image sensor of the aerial vehicle can be selected as the target sensor, and the instruction information carrying the time stamp can be sent to the external image sensor. A time of capturing an image can be determined based upon a time indicated by the time stamp in the data packet returned from the image sensor. A corresponding attitude data at the time of capturing an image can be selected from among data collected by the attitude sensor, such that an analysis on data collected from different sensors at the same time can be effected.

In some embodiments, in order to determine whether a data packet returned from the sensor is a synchronized data packet carrying a time stamp as a result of an instruction of synchronization from the controller, the data packet returned from the sensor can be provided with a synchronization indication. The synchronization indication can be used to indicate that the data packet carries the time stamp. In some instances, the synchronization indication can be a synchronization bit which is set in the data packet. The synchronization bit in the data packet can be set to 1 if the data packet is collected by the sensor as a result of instruction information from the controller. The synchronization bit in the data packet being set to 1 can indicate that the data packet is a synchronized data packet as a result of an instruction from the controller.

Figure 2:
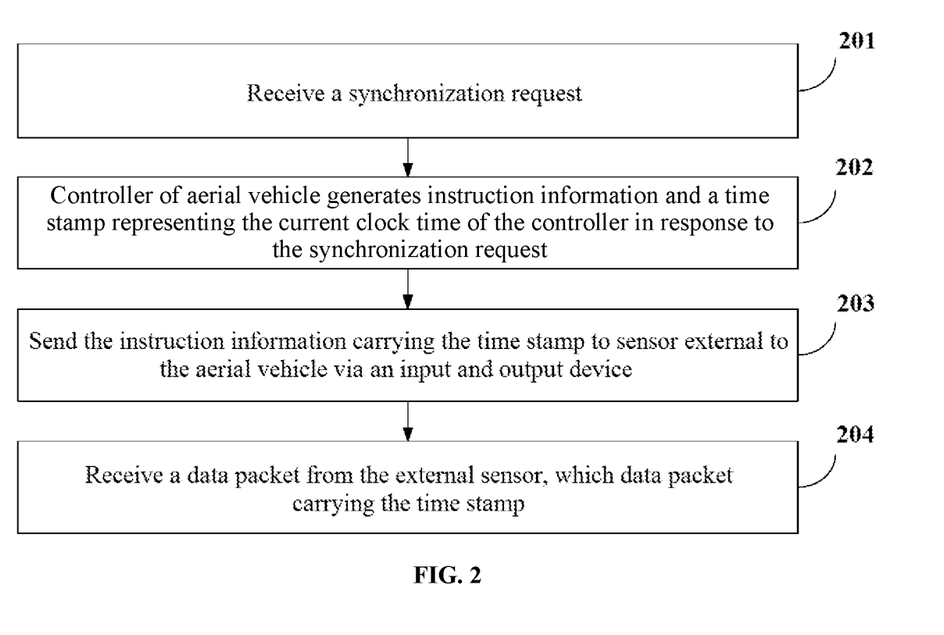
FIG. 2 shows a flow chart of a method of data synchronization for an aerial vehicle in accordance with another embodiment of the disclosure.

A method of data synchronization of the disclosure, where the controller of the aerial vehicle performs a data synchronization to part of the external sensors of the aerial vehicle, will be described by way of example. FIG. 2 shows a flow chart of a method of data synchronization for an aerial vehicle in accordance with another embodiment of the disclosure. It will be appreciated that, the embodiment is simply an illustrative embodiment. Various other embodiments can be possible to implement the method of data synchronization. The method of data synchronization can comprise steps 201 to 204.

In step 201, a synchronization request can be received.

The synchronization request can be the instruction of synchronization as described in embodiments hereinabove. In some instances, the synchronization request can be provided by a sensor external to the aerial vehicle. Optionally, the synchronization request can be provided by a control device, such as a remote controller controlling the aerial vehicle.

It will be appreciated that, in some embodiments, a specific application program performing a data synchronization of sensors can be preset in the controller. A callable interface can be provided by the specific application program. The external sensor or the control device (e.g., the remote controller) can send the synchronization request to the controller by calling the interface. The controller can be thus triggered to run the application program, generate a time stamp and perform subsequent operations.

In some instances, the synchronization request can be a request for a single synchronization. Optionally, the synchronization request can be a request for periodic data synchronization.

In step 202, the controller of the aerial vehicle can generate instruction information and a time stamp representing the current clock time of the controller in response to the synchronization request.

In step 203, the instruction information carrying the time stamp can be sent to the sensor external to the aerial vehicle via an input and output device.

The controller can, in response to the synchronization request, generate the time stamp representing the current clock time of the controller while generating the instruction information.

In sending the instruction information carrying the time stamp, the controller can send the instruction information together with the time stamp which is generated simultaneously with the instruction information to the external sensor. Optionally, the controller can insert the time stamp into the instruction information while generating the instruction information, such that the instruction information can comprise the time stamp.

It will be appreciated that, the controller can generate the time stamp only once if the synchronization request is a request for a single synchronization. The step 203 can then be performed. Optionally, if the synchronization request is a request for periodic synchronization, the controller can generate the time stamp periodically on basis of a data synchronization cycle defined in the synchronization request, and send the instruction information carrying the time stamp periodically. Steps 202 and 203 can be performed multiple times, such that the data synchronization can be performed periodically.

In step 204, a data packet can be received from the external sensor, which data packet carrying the time stamp. Once receiving the instruction information, the external sensor can collect data and insert the time stamp carried by the instruction information to the data packet. For instance, the external sensor can return the data packet to the controller via the input and output device. In some instances, the data packet can be provided in a specified protocol format.

In some instances, the data packet can comprise a synchronization bit which is set to 1.

In some embodiments, once receiving the data packets returned from the sensors, the controller can determine a clock time represented by the time stamp carried in each one of the data packets, and analyze data packets collected at the same clock time based upon the clock time represented by the time stamp carried in the data packets. For instance, a time stamp a can be carried in a data packet 1 returned from sensor 1, a time stamp b can be carried in a data packet 2 returned from sensor 2, and a time stamp a can be carried in a data packet 3 returned from sensor 3. In some instances, a time of receiving the data packets from various sensors can be different. The controller can determine that a time of the sensor 1 collecting data in the data packet 1 can be identical to a time of the sensor 3 collecting data in the data packet 3 by determining that the time stamp carried in the data packet 1 being identical to the time stamp carried in the data packet 3. Data in the data packet 1 and data packet 3 can indicate states of the aerial vehicle at the same time and thus can be analyzed with reference to one another as they are synchronized data packages. However, a time of the sensor 2 collecting the data packet 2 can be different from a time of the sensor 1 and sensor 3 collecting the data packets 1 and 3. The data packet 2 can indicate a state of the aerial vehicle at different a time from that of the data packets 1 and 3, and thus data packet 2 can not be analyzed with reference to data packets 1 and 3.

On the other hand, as a clock of the built-in sensor of the aerial vehicle is inherently synchronized with a clock of the controller, a time of the built-in sensor collecting data can be accurately determined even if no data synchronization is performed. In some embodiments, the controller can determine and analyze data collected at the same time based upon a time of the built-in sensor collecting data and a synchronized time of the external sensor collecting data. For instance, the controller can send the instruction information to an image sensor external to the aerial vehicle. Attitude data of the aerial vehicle can be returned from a built-in attitude sensor of the aerial vehicle while data is returned from the image sensor. The controller can determine a clock time represented by the time stamp carried in the data packet returned from the image sensor, determine attitude data collected by the attitude sensor at the same clock time the image sensor collecting data based upon the clock time represented by the time stamp carried in the data packet returned from the image sensor, and analyze a flight state of the aerial vehicle based upon the determined attitude data collected by the attitude sensor and the data packet collected by the image sensor.

The disclosure further provides a method of data collection for an aerial vehicle on basis of an operation performed by a sensor in the method of data synchronization for an aerial vehicle as described hereinabove.

Figure 3:
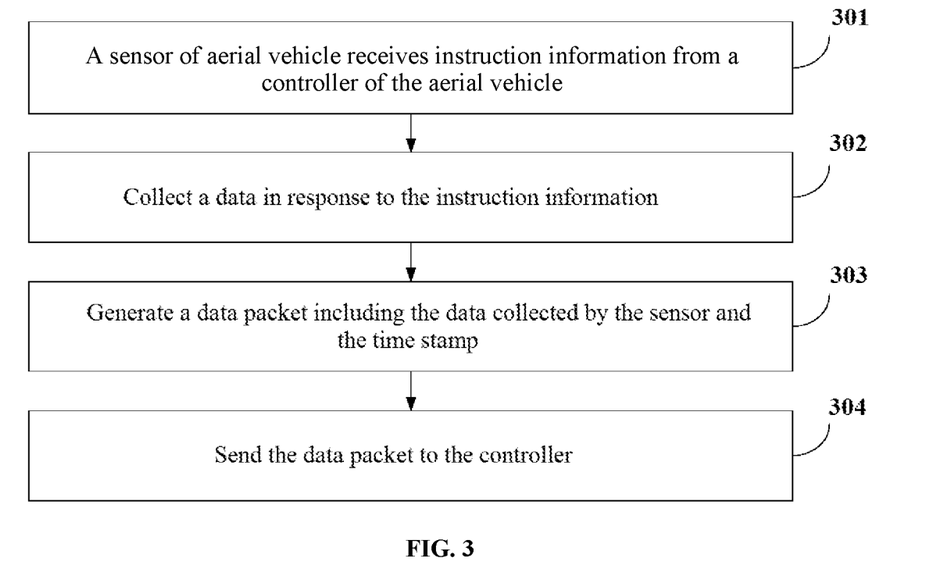
FIG. 3 shows a flow chart of a method of data collection for an aerial vehicle in accordance with an embodiment of the disclosure.

FIG. 3 shows a flow chart of a method of data collection for an aerial vehicle in accordance with an embodiment of the disclosure. In some embodiments, the method of data collection for an aerial vehicle can comprise steps 301 to 304.

In step 301, instruction information can be received by a sensor of the aerial vehicle from a controller of the aerial vehicle.

In some instances, a time stamp can be carried in the instruction information. The time stamp can be generated by the controller to indicate a clock time of the controller.

A process of generating the time stamp is provided in the method of data synchronization as described hereinabove. A detailed description will be omitted for conciseness.

In step 302, data can be collected in response to the instruction information.

Once receiving the instruction information, the sensor can collect and obtain data.

In step 303, a data packet including the data collected by the sensor and the time stamp can be generated.

Different from the conventional technology, the time stamp of the instruction information can be added into the collected sensor data before sending the collected sensor data to the controller. A data packet including the collected sensor data and the time stamp can be generated, such that the controller can determine a time of the sensor collecting the date based upon the time stamp in the data packet.

In step 304, the data packet can be sent to the controller.

In embodiments of the disclosure, a time stamp can be carried in the instruction information which directs the sensor to collect data. The time stamp can represent a clock time of the controller to indicate a clock time at which the controller directs the sensor to collect data. The time stamp can be carried in the data packet returned from the sensor. In this way, the controller can determine a clock time of the sensor collecting data based upon the time stamp carried in the data packet returned from the sensor. As a clock time of the time stamp is based on the clock time of the controller, a data synchronization can be effected by determining data collected by various sensors at the same time based upon the time stamps carried in various data packets. Errors in data analysis due to data collected at different times can be avoided.

In some instances, in the method of data collection for aerial vehicle in accordance with embodiments of the disclosure, the sensor of the aerial vehicle can be a sensor external to the aerial vehicle. In some instances, the clock of the sensor external to the aerial vehicle can be asynchronous with the clock of the controller.

In some instances, the process of generating a data packet including the data collected by the sensor and the time stamp can comprise generating a data packet including the data collected by the sensor, the time stamp and a synchronization indication, which synchronization indication indicating that the data packet carries a time stamp.

In some instances, the synchronization indication can be a synchronization bit which is set to 1.

In some instances, the process of receiving instruction information from a controller of the aerial vehicle can comprise receiving a pulse signal from the controller, which pulse signal carrying the time stamp.

In some instances, the sensor can receive the pulse signal from the controller via an input and output device if the sensor is external to the aerial vehicle.

The disclosure further provides a device of data synchronization for an aerial vehicle corresponding to the method of data synchronization for aerial vehicle.

Figure 4:
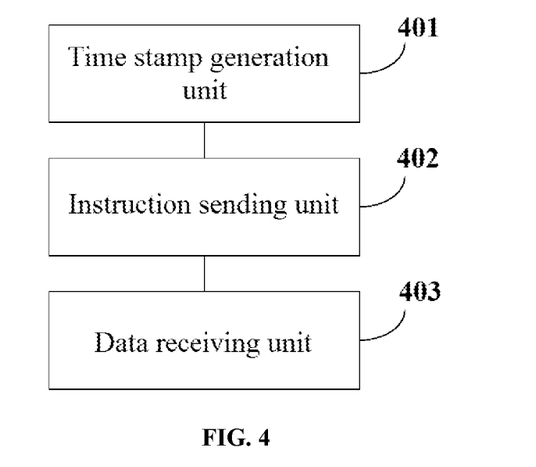
FIG. 4 shows a structure of a device of data synchronization for an aerial vehicle in accordance with an embodiment of the disclosure.

FIG. 4 shows a structure of a device of data synchronization for an aerial vehicle in accordance with an embodiment of the disclosure. In some embodiments, the a device of data synchronization for an aerial vehicle can comprise a time stamp generation unit 401, an instruction sending unit 402 and a data receiving unit 403.

In some embodiments, the time stamp generation unit 401 can be configured to generate a time stamp representing a current clock time of the controller. The instruction sending unit 402 can be configured to send instruction information to a sensor of the aerial vehicle to direct the sensor to collect data. In some instances, the time stamp can be carried in the instruction information. The data receiving unit 403 can be configured to receive a data packet returned from the sensor. In some instances, the data packet can include data collected by the sensor in response to the instruction information and the time stamp.

In some instances, the time stamp generation unit can comprise a time stamp generation subunit configured to generate a time stamp representing a current time if a condition of synchronization is satisfied.

In some embodiments, the time stamp generation subunit can comprise a first generation subunit configured to generate the time stamp representing a current time upon detecting an instruction of synchronization.

In some instances, the first generation subunit can comprise a request trigger subunit configured to generate a time stamp representing a current time if a synchronization request initiated by a sensor external to the aerial vehicle is detected. In some instances, a clock of the sensor external to the aerial vehicle can be not synchronized with a clock of the controller.

Alternatively, the time stamp generation subunit can comprise a cycle detection subunit configured to detect whether a current time is a data synchronization time which is calculated from a preset data synchronization cycle, and a cycle generation subunit configured to generate the time stamp representing a current time if the current time is the data synchronization time.

Alternatively, the time stamp generation subunit can comprise an initiation subunit configured to generate the time stamp representing a current time if the instruction of synchronization is generated by the controller.

In some instances, the instruction sending unit can comprise an instruction sending subunit configured to send the instruction information to a sensor external to the aerial vehicle. In some instances, a clock of the sensor external to the aerial vehicle can be not synchronized with a clock of the controller.

In some instances, the instruction information sent by the instruction sending unit to the sensor of the aerial vehicle can be a pulse signal. In some instances, the pulse signal can carry the time stamp and can be used to direct the sensor to collect data.

In some instances, the sensor can be a sensor external to the aerial vehicle, and the instruction sending unit can comprise a pulse sending subunit configured to control an input and output device of the aerial vehicle to output a pulse signal to the sensor external to the aerial vehicle.

In some instances, the data packet received by the data receiving unit can comprise a synchronization indication, which synchronization indication indicating that the data packet carries the time stamp.

In some instances, the synchronization indication can be a synchronization bit in the data packet which is set to 1.

In some embodiments, the device can further comprise a target determination unit configured to determine at least one target sensor for clock synchronization from among sensors of the aerial vehicle before the instruction information is sent by the instruction sending unit. The instruction sending unit can comprise a target instructing subunit configured to send the instruction information to the at least one target sensor of the aerial vehicle.

In some embodiments, the device can further comprise a time determination unit configured to determine a clock time represented by the time stamp carried in the data packet, and a data analysis unit configured to analyze data packets corresponding to the same clock time based upon the clock time represented by the time stamp carried in the data packet.

Another aspect of the disclosure provides a device of data collection for an aerial vehicle corresponding to a method of data collection for an aerial vehicle as discussed hereinabove.

Figure 5:
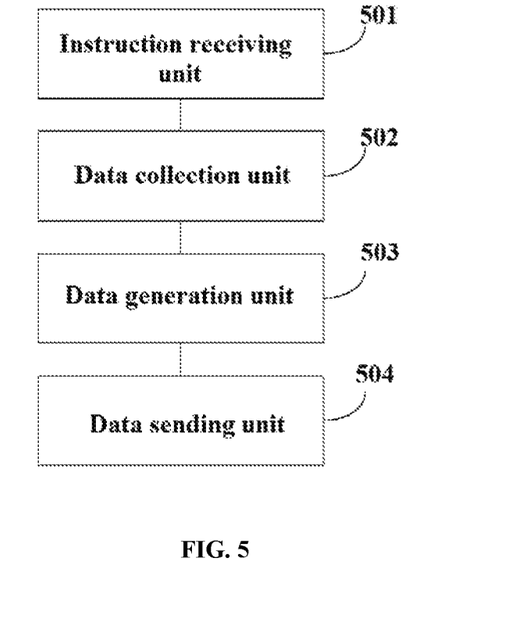
FIG. 5 shows a structure of a device of data collection for an aerial vehicle in accordance with an embodiment of the disclosure.

FIG. 5 shows a structure of a device of data collection for an aerial vehicle in accordance with an embodiment of the disclosure. In some embodiments, the device of data collection for an aerial vehicle can comprise an instruction receiving unit 501, a data collection unit 502, a data generation unit 503 and a data sending unit 504.

The instruction receiving unit 501 can be configured to receive instruction information from a controller of the aerial vehicle, a time stamp being carried in the instruction information. In some instances, the time stamp can be generated by the controller to indicate a clock time of the controller.

The data collection unit 502 can be configured to collect data in response to the instruction information.

The data generation unit 503 can be configured to generate a data packet including data collected and the time stamp.

The data sending unit 504 can be configured to send the data packet to the controller.

In some instances, the device of data collection can be provided in a sensor external to the aerial vehicle. In some instances, a clock of the sensor external to the aerial vehicle can be not synchronized with a clock of the controller.

In some instances, the instruction receiving unit can comprise a pulse receiving unit configured to receive a pulse signal from the controller. In some instances, the pulse signal can carry the time stamp.

In some instances, when the device of data collection is provided in the sensor external to the aerial vehicle, the pulse receiving unit can be configured to receive the pulse signal from the controller via an input and output device.

In some instances, the data generation unit can comprise a data generation subunit configured to generate a data packet including data collected by the sensor, the time stamp and a synchronization indication. In some instances, the synchronization indication can be used to indicate that the data packet carries the time stamp.

In some instances, the synchronization indication can be a synchronization bit. The synchronization bit can be set to 1.

Another aspect of the disclosure provides an aerial vehicle.

Figure 6:
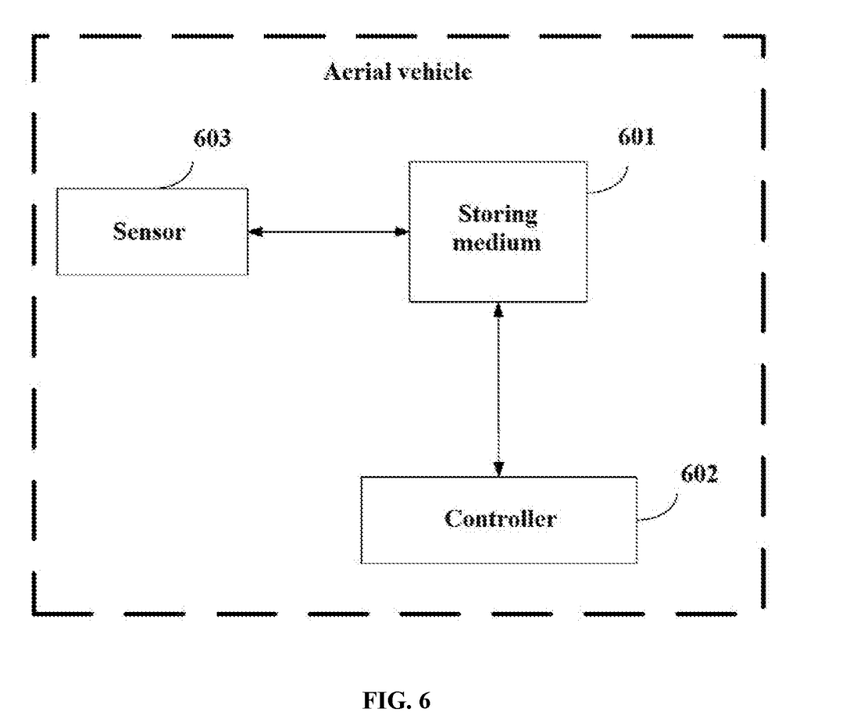
FIG. 6 shows a structure of an aerial vehicle in accordance with an embodiment of the disclosure.

FIG. 6 shows a structure of an aerial vehicle in accordance with an embodiment of the disclosure. In some embodiments, the aerial vehicle can comprise a storing medium 601, a controller 602 and at least one sensor 603.

In some instances, the controller 602 can be configured to generate a time stamp representing a current clock time of the controller, send instruction information to the sensor, and receive a data package returned from the sensor. In some instances, the instruction information can be used to direct the sensor to collect data. The instruction information can carry the time stamp.

The sensor 603 can be configured to collect data in response to the instruction information, generate a data packet including data collected by the sensor and the time stamp, and send the data packet to the controller.

The storing medium 601 can be configured to store a program data of the controller and the sensor.

In some instances, the sensor can be a sensor external to the aerial vehicle. In some instances, a clock of the sensor external to the aerial vehicle can be not synchronized with a clock of the controller.

It will be appreciated that, embodiment as described hereinabove are provided in a progressive manner. The description of respective embodiment may emphasize a difference of the embodiment over others, a reference to other embodiments can be made for those same or similar components. A description of devices can be simplified in view of a similarity with methods, and a reference to description of the methods can be made.

It will be appreciated by those skilled in the art that, various exemplary units and algorithms described with reference to embodiments of the disclosure can be implemented by an electronic hardware, a computer software or a combination thereof. A function of various exemplary components and steps are generally described in the disclosure to illustrate an interchangeability between a hardware and a software. In specific implementation of the functions (e.g., with a hardware or a software) can be determined in view of a specific application and a design constraint of the technical solution. Those skilled in the art can implement a function through various possible solutions for a specific application without departing a scope of the disclosure.

The description of the disclosed embodiments can enable those skilled in the art to implement the disclosure. Numerous variations can be obvious to those skilled in the art. The technical solutions of the disclosure can be implemented with other embodiments without departing a spirit or a scope of the disclosure. A scope of the disclosure is not limited to the embodiments described hereinabove, but can be interpreted to the widest scope which is consistent with the principles and novel features disclosed hereinabove.

What is claimed is:

1. A method for synchronizing data collected by one or more sensors of an aerial vehicle, comprising:
generating, by a controller of the aerial vehicle, one or more time stamps each representing a clock time of the controller;
sending instruction information to one or more sensors of the aerial vehicle, the instruction information carrying the one or more time stamps and directing the one or more sensors to perform data collection, the one or more sensors including an image sensor external to the aerial vehicle, and a clock of the image sensor being not synchronized with a clock of the controller;
receiving a plurality of data packets returned from the one or more sensors, each of the plurality of data packets carrying one of the one or more time stamps and including data collected by one of the one or more sensors in response to the instruction information;
obtaining attitude data collected by an attitude sensor built in the aerial vehicle;
determining clock times represented by the time stamps carried in the plurality of data packets, respectively, that are returned from the one or more sensors;
for each time stamp:
determining the attitude data collected by the attitude sensor at the same clock time as the image sensor collecting data based upon the corresponding determined clock time; and
analyzing a flight state of the aerial vehicle based upon the determined attitude data collected by the attitude sensor and the data packet returned by the image sensor; and
analyzing two or more of the plurality of data packets corresponding to a same clock time based upon the clock times represented by the time stamps carried in the plurality of data packets.

2. The method of claim 1, wherein generating the one or more time stamps includes generating the one or more time stamps in response to a condition of synchronization being satisfied.

3. The method of claim 1, wherein sending the instruction information to the one or more sensors of the aerial vehicle includes sending one or more pulse signals to the one or more sensors of the aerial vehicle, each of the one or more pulse signals carrying one of the one or more time stamps and directing one of the one or more sensors to perform data collection.

4. The method of claim 3,
further comprising:
sending the one or more pulse signals to the one or more sensors of the aerial vehicle includes controlling an input and output device of the aerial vehicle to output at least one of the one or more pulse signals to the sensor external to the aerial vehicle.

5. The method of claim 1, further comprising, before sending the instruction information to the one or more sensors of the aerial vehicle:
determining the one or more sensors from among a plurality of sensors of the aerial vehicle.

6. An apparatus for synchronizing data collected by one or more sensors of an aerial vehicle, comprising:
a controller; and
a storing medium storing a program that, when executed by the controller, causes the controller to:
generate one or more time stamps each representing a clock time of the controller;
send instruction information to one or more sensors of the aerial vehicle, the instruction information carrying the one or more time stamps and directing the one or more sensors to perform data collection, the one or more sensors including an image sensor external to the aerial vehicle, and a clock of the image sensor being not synchronized with a clock of the controller;
receive a plurality of data packets returned from the one or more sensors, each of the plurality of data packets carrying one of the one or more time stamps and including data collected by one of the one or more sensors in response to the instruction information;
obtain attitude data collected by an attitude sensor built in the aerial vehicle;
determine clock times represented by the time stamps carried in the plurality of data packets, respectively, that are returned from the one or more sensors;
for each time stamp:
determine the attitude data collected by the attitude sensor at the same clock time as the image sensor collecting data based upon the corresponding determined clock time; and
analyze a flight state of the aerial vehicle based upon the determined attitude data collected by the attitude sensor and the data packet returned by the image sensor; and
analyze two or more of the plurality of data packets corresponding to a same clock time based upon the clock times represented by the time stamps carried in the plurality of data packets.

7. The apparatus of claim 6, wherein the program further causes the controller to generate the one or more time stamps in response to a condition of synchronization being satisfied.

8. The apparatus of claim 7, wherein the program further causes the controller to generate the one or more time stamps upon detecting an instruction to synchronize.

9. The apparatus of claim 8, wherein the program further causes the controller to generate the one or more time stamps in response to detecting a synchronization request initiated by the image sensor external to the aerial vehicle.

10. The apparatus of claim 7, wherein the program further causes the controller to generate the one or more time stamps in response to the condition of synchronization being satisfied by:
detecting whether a current clock time is a data synchronization time calculated from a preset data synchronization cycle; and
generating one of the one or more time stamps representing the current clock time in response to the current clock time being the data synchronization time.

11. The apparatus of claim 7, wherein the program further causes the controller to generate the one or more time stamps in response to the condition of synchronization being satisfied by generating the one or more time stamps in response to the controller generating an instruction to synchronize.

12. The apparatus of claim 6, wherein the program further causes the controller to send the instruction information to the one or more sensors of the aerial vehicle by sending one or more pulse signals to the one or more sensors of the aerial vehicle, each of the one or more pulse signals carrying one of the one or more time stamps and directing one of the one or more sensors to perform data collection.

13. The apparatus of claim 12, wherein:
the program further causes the controller to control an input and output device of the aerial vehicle to output at least one of the one or more pulse signals to the image sensor external to the aerial vehicle.

14. The apparatus of claim 6, wherein each of the plurality of data packets includes a synchronization indication indicating that the data packet carries one of the one or more time stamps.

15. The apparatus of claim 6, wherein the program further causes the controller to, before sending the instruction information to the one or more sensors of the aerial vehicle:
determine the one or more sensors from among a plurality of sensors of the aerial vehicle.

* * * * *